Figure 1:
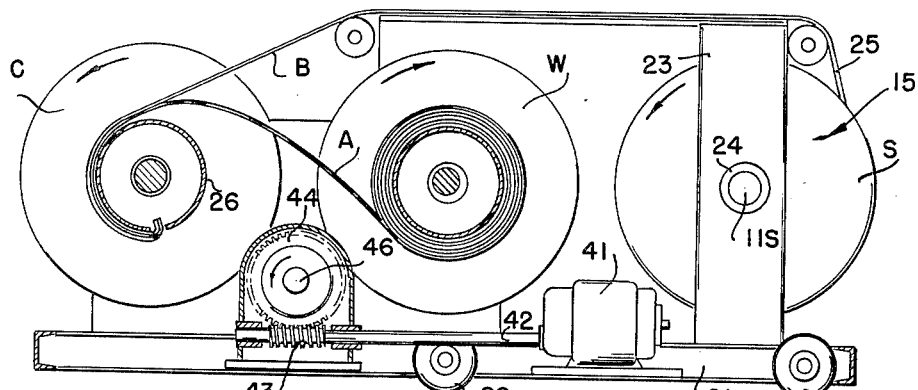

INVENTOR.
HELEN H. BREFFLE
BY
*Bussinger*
ATTORNEY

June 25, 1963 H. H. BREFFLE 3,094,833
MULTI-STRAND CABLE FABRICATING APPARATUS AND METHOD
Filed July 10, 1961 2 Sheets-Sheet 2

INVENTOR.
HELEN H. BREFFLE
BY
ATTORNEY

United States Patent Office 3,094,833
Patented June 25, 1963

3,094,833
MULTI-STRAND CABLE FABRICATING
APPARATUS AND METHOD
Helen H. Breffle, 7301 W. 48th Ave.,
Wheatridge, Colo.
Filed July 10, 1961, Ser. No. 123,006
6 Claims. (Cl. 57—1)

The present invention relates to strand paralleling apparatus useful in the making and fabrication of multi-strand cables.

Previously, many different types of paralleling apparatus have been devised and used both in the factories and at job sites to obtain cables of either convenient supply length or of length particularly suited to the job at hand. In the factories the assembly of many strands into a single cable is accomplished by drawing each of the separate strands from a separate source and joining the strands in a cable which may be wrapped or covered in any one of many different ways before being coiled and packaged for sale in convenient and predetermined lengths. The types of apparatus used in the factories is in general satisfactory to accomplish its intended purpose efficiently and without waste.

The present tendency, however, to provide strands of wire, rope and various types of filament in precut and measured lengths, however, presents a serious problem when it is desired to fabricate a cable of many strands from a single strand supply. The problem presented is at the present time in acute proportions in the electrical industries and is at least of troublesome nature in similar fields.

At the present time electrical wire is usually sold in coiled units distributed either in box packages or on individual carrying reels. The major suppliers of electrical wire sell such wire in specified lengths of 500, 1,000, and 1,500 feet. Wire that is received on the job site in packages of specific lengths must be used on the site to fabricate multi-strand cables or parallel runs of the same or different kinds of electrical wire. A serious problem arises when relatively long runs of electrical cable are required. As an example, if three parallel strands 320 feet in length are required to make up a three-conductor cable or for use in parallel runs through a conduit, the contractor at present would probably pull the three separate strands from three separate supply reels of the packaged length. If 500 foot reels are used, each reel will be left with a 180 foot remainder. On many jobs such left-over segment may then be of too short length for use, and consequently the unused wire will represent a direct waste or an unwanted capital investment and troublesome storage problem. If all three of the 320 foot lengths of strand wire could be economically obtained from a single 1,000 foot reel, the total waste would be reduced to 40 feet. With some types of expensive cable, the contractor is justified in expending the necessary labor involved in manually stretching out three separate 320 foot strands of wire from a single supply reel. In most instances, however, the additional labor costs involved are too high to justify the use of manual layout procedures.

Recognizing the foregoing problems and further realizing the fact that it is not always convenient to individually stretch out the separate strands of a long cable, the present inventor has developed mechanisms and methods for the reduction of wastes and the conservation of skilled labor in the making and fabrication of multi-strand cables. In the solution of such problem, the developments have been guided by the following objects:

To provide a method and mechanism adapted to more conveniently and economically fabricate multi-strand cables from a single strand supply.

To provide mechanisms for the convenient handling of strand materials in relatively longer unit quantities for the economic fabrication of multi-strand cables.

To provide a method and mechanisms for the fabrication of cables having varied numbers of separate strands all derived from a single strand supply.

To provide a mechanism for the fabrication and convenient customer handling of multi-strand cables.

To provide drive, support and control mechanisms for multi-strand cable fabricating and handling apparatus.

To provide apparatus of the foregoing types adaptable for efficient use in factories, distribution centers and at job sites.

To provide mechanisms and apparatus for facilitating the fabrication and on-site installation of multi-strand cables.

To provide cable binding apparatus for use with mechanisms of the foregoing types.

To provide multi-strand cable fabricating apparatus inclusive of strand and cable length tabulating and cutting mechanisms.

To provide mechanisms for the cooperative drive rotation of a plurality of reels whereby the fabrication of multi-strand cables is facilitated.

To provide reel drive mechanisms inclusive of gear reduction apparatus useful as a winch drive for facilitating the installation of cable and wires at on-site locations.

Figure 2:
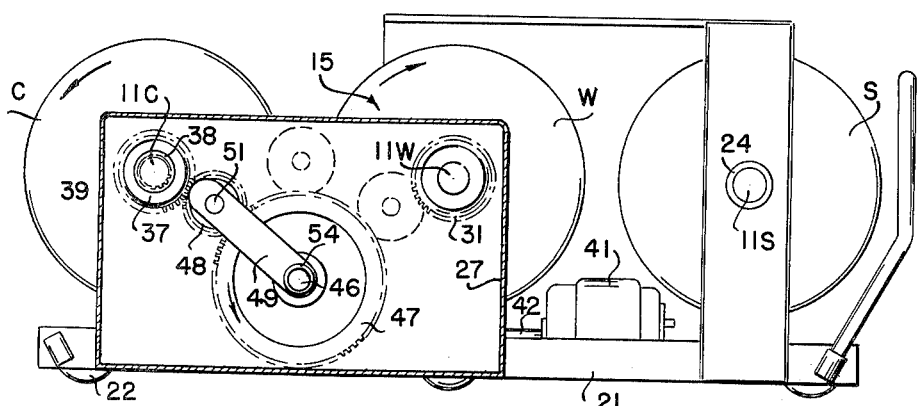
Figure 3:
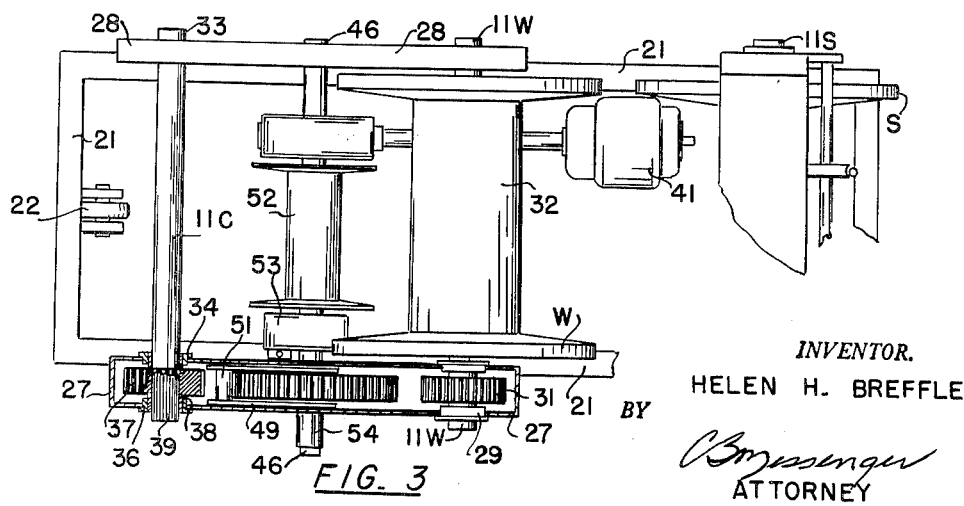
Figure 5:
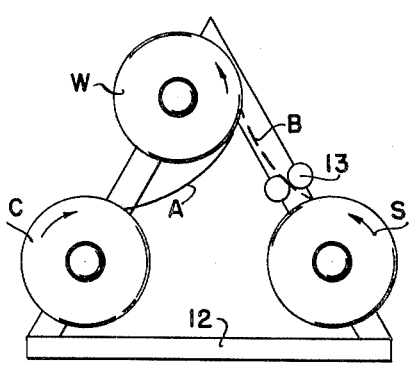
Figure 6:
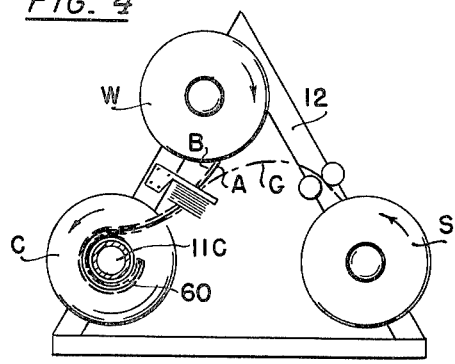
Figure 7:
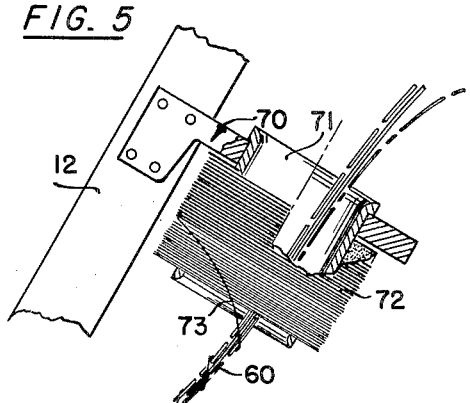
Figure 8:
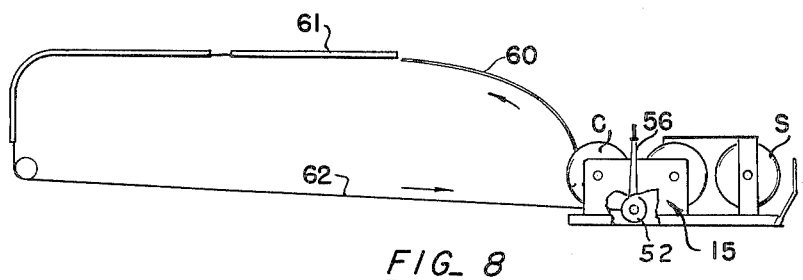

Further objects and advantages of the present invention will be apparent from the appended description and drawings, in which FIG. 1 is a side elevation in partial section illustrating one embodiment of the invention, FIG. 2 is a cross-sectional elevation taken through the gear drive mechanism of the embodiment shown in FIG. 1, FIG. 3 is a top plan view further illustrating details of construction for the embodiment shown in FIGS. 1 and 2, FIGS. 4, 5 and 6 are illustrations indicating the step processes used in the practice of the present invention, FIG. 7 is a partial cross-sectional elevation illustrating the structural features of a binding apparatus used in connection with the present invention, and FIG. 8 is a side elevation in partial cross-section showing one manner of use of the invention.

Briefly stated, the present invention relates to a method for the fabrication of multi-strand cables from a single strand supply. Essentially the invention entails the use of a plurality of reels, spools or strand coiling members disposed in such manner that lengths of strand material from the single strand supply may be alternately wound about alternate reels until a single cable having the required number of strands is finally wound about a customer reel for delivery to the purchaser or job site. The reeving pattern for the single strand materials and for the single strand materials that have already been combined to provide a partial cable is cooperatively arranged to move the strands alternately between an intermediate working reel and the final customer reel until the desired cable has been obtained. The invention includes and contemplates various types of drive and drive control mechanisms as necessary to obtain the desired reeving and strand movement pattern.

Figure 4:
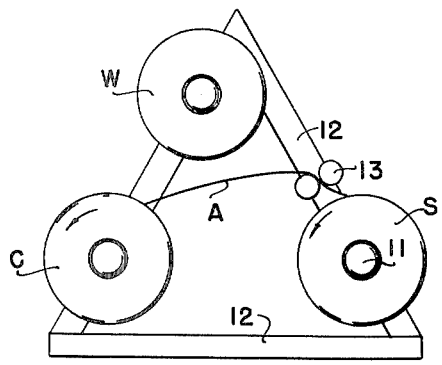

The specifiec embodiment of the invention shown in FIGURES 1 through 3 and 8 will perhaps be best understood after reference to the illustrations presented in FIGURES 4, 5 and 6, wherein the fabrication of a three-strand cable is schematically illustrated.

When it is desired to make up a multi-strand cable, a reel or supply package of wire of the desired size is selected and is placed either on or adjacent the paralleling apparatus. In the illustration, the single strand material is received on a supply reel S which is mounted on an arbor 11 for free rotation with respect to its frame support 12 and arbor. A first length A of the strand material is passed through length measuring apparatus 13 and is engaged to the customer reel C. Subsequently the full length of strand A is wound on customer reel C, and thereafter the supply strand is cut to leave a full cable length of strand A on reel C. As a next step, the cut terminal end of strand A and the newly severed lead end of the supply strand material are engaged jointly on the intermediate working reel W, and subsequently a full second strand length B is removed from the supply reel. Strand B is for purposes of illustration in these figures indicated by a line of long dashes, but it should be recognized that the actual strand material itself is merely a continuing length of the original strand material from supply reel S. After the full length of strands A and B have been wound about the intermediate working reel W and the full negth of strand B has been determined either by matching with the length of strand A or by further indication of the measuring device 13, strand B is severed from the supply reel. The next step, as illustrated in FIGURE 6, involves the rewinding of strands A and B together with a further strand G from supply reel S onto the customer reel C.

In this manner it will be observed that a three-strand cable has been derived and is, after completion of the steps and the severing of the final strand G, entirely received and wound on customer reel C. Reel C may thereafter be removed from its supporting arbor 11C on the frame 12 for delivery to, or use by, the customer. The multi-strand cable derived from such operation in many instances represents a considerable saving due to the increased freedom from waste and the conservation of skilled labor.

The process and method described is not limited to the production of cables of any specified number of strands. A five-strand cable or a cable having any odd number of strands could be derived through practice of the described steps followed by the addition of an even number of additional steps moving the incomplete cable from the customer reel to the working reel and subsequently back to the customer reel with each step adding a further strand from the supply source.

A cable having an even number of strands can also be wound on the customer reel ready for delivery by the simple expedient of starting the first step of the cable layup on the working reel instead of the customer reel as described. Further, if a multi-strand cable is to be fabricated which uses more than the full and total length of one supply reel, a plurality of supply reels may be mounted in side by side relation on the arbor 11S so that a corresponding plurality of strands may be moved at the same time from such combined supply source. In all instances, the number of strands removed from the supply reel or reels, and accordingly the total length of single strand material used, may be regulated to avoid the unnecessary accumulation of waste segments of strand material or filament on multiple reels. The total waste on any job may be reduced considerably with consequent reduction of overhead and an increased profit. The forced accumulation of many reels which have usable lengths of wire remaining that cannot be presently used and which cannot be economically thrown away can be substantially avoided. The savings possible from the reduction of required storage space and elimination of unprofitable overhead accumulations make use of the described system economically desirable even where substantial drive and control mechanisms are necessary to the successful application of the method.

Actually, the full advantages of the method are best developed in connection with the provision of mechanisms for cooperatively moving the separate strands and incomplete cable assemblies through the described reeving patterns. Many different reel mounting arrangements are possible within the requirements of the system.

Likewise, it is true that many different drive mechanisms can be used to satisfactorily move and rotate the respective winding reels. While in some instances it may be advisable to conjointly drive and rotate two or more of the reels at the same time, a simplified system is possible in an arrangement in which two reels are selectively driven in forward and reverse directions. A further simplified system, as shown in FIGURES 1 through 3, includes the powered driving of two reels with each of the reels being rotated under applied power in a first direction and free to rotate in a reverse direction. When such system is used, the driven reel serves to wind the cable strands about its own reel drum, and at the same time rotates the reels from which the strands are being pulled by the pulling force exerted on the strands themselves. The two reels that are to be powered are necessarily the intermediate working reel W, which may be permanently mounted on the apparatus, and the customer reel C, which should be adapted for convenient and easy removal from the apparatus.

As illustrated in FIGURES 1 through 3, the described mechanism is all preferably mounted on a bed frame 21 which may be either permanently installed or which, for convenient use in the field, may be mounted on rollers 22. Where the bed frame 21 is mounted on rollers 22. Where the bed frame 21 is mounted on rollers 22, the entire strand paralleling apparatus 15 may be moved about the factory, shop or job site as required.

In the particular embodiment illustrated, an upright support 23 is provided for the receipt and holding of supply reel S. The support 23 provides a bearing mount 24 through which arbor 11S may be inserted when the reel is raised to proper position. With one or more reels disposed on the arbor 11S, singly or in side by side relation, the entire supply is free to rotate about arbor 11S so that strand material 25 may be pulled from a supply reel S.

In the illustration of FIGURE 1, it is seen that the first strand A has previously been removed from the supply S and is received on intermediate working reel W. The strand material 25 shown being withdrawn from the supply corresponds to the second strand B identified in the previous description. Strands A and B it will be noted are now both being wound about the drum face 26 of the customer reel C. The winding of strands A and B on the reel C is accomplished by the counter-clockwise rotation of reel C which pulls strands A and B away from their respective previous windings. When reel C is rotated in counter-clockwise direction, reel W will be rotated in a clockwise direction, and reel S will be pulled in the counter-clockwise direction. In order to assure the desired application of driving power and further to provide for the free reverse rotation of the powered reels, each of the reels C and W are likewise mounted on arbors 11C and 11W respectively. The mounting for reel W includes the upright gear box 27 and the support pedestal 28 disposed on opposite sides of the base frame 21. The gear box 27 and pedestal 28 provide support for bearings, inclusive of the bearings 29 in gear box 27 for the rotative support of arbor shaft 11W. This shaft 11W is keyed to a spur gear 31 within gear box 27 and is further attached to the drum 32 of the intermediate working reel W. With this arrangement, rotation of spur gear 31 will cause rotation of arbor shaft 11W and of the working reel W and its associated drum 32. Ordinarily the described drive apparatus for the working reel W and the working reel itself will be permanently mounted in its supports, since use of the apparatus does not require the removal of this intermediate reel.

Customer reel C should be adapted for convenient removal from the apparatus. For this reason, arbor shaft 11C is removably supported between gear box 27 and pedestal 28 by its bearings. The bearings (not shown) in pedestal 28 are of simple sleeve type to receive the smooth surfaced end 33 of arbor shaft 11C. Two separate bearings 34 and 36 are supported by the inside and outside walls of gear box 27 to provide rotative support for spur gear 37 and its outwardly extending hollow trunnion shaft 38. The smooth outer surface of trunnion 38 turns freely in the described bearings 34 and 36 when spur gear 37 is turned. The inner surface of hollow trunnion 38 is cut to mate with and receive the splines 39 on arbor shaft 11C when the arbor shaft is fully inserted to its reel supporting and driving position.

With this arrangement, rotation of the spur gear 37 will cause a corresponding rotation of the customer reel 11C. One type of drive arrangement for rotating the spur gears 31 and 37 and the arbor shafts 11W and 11C with which they are associated is illustrated in FIGURES 1, 2 and 3. In explanation of this embodiment of the invention, it should be understood that only the intermediate working reel and the customer reel are to be power driven, and these reels will be driven under power only in a counter-clockwise direction. Operation of the device requires only that one reel be driven at a time, and further that when one reel is being driven, all the other reels inclusive of the supply reel shall be free to rotate as strand materials are pulled away from such reels.

To obtain this desired drive arrangement, the present embodiment uses an electric motor 41 which need not be of a reversing type. The motor may be either of a direct drive or of the gear head type illustrated depending upon the desired rotative speeds for the customer and intermediate working reels. The output shaft 42 of the motor 41, which rotates in a counter-clockwise direction, is connected to the drive pinion 43 of a worm gear system so that rotation of the motor drive shaft 42 will cause a counter-clockwise rotation of gear 44 and of its mounting shaft 46. Rotation of shaft 46 causes a corresponding counter-clockwise rotation of drive gear 47 which is keyed to and rotated with the shaft 46.

The drive energy imparted to drive gear 47 may be selectively transmitted to spur gears 31 or 37 by shifting the position of the idler gear 48. When the support crank arm 49 is moved to the position illustrated in FIGURE 2, the consequent rotation of idler gear 48 about its throw arm stub shaft 51 will be transmitted to the spur gear 37, its turning shaft 38 and through the splines 39 to arbor shaft 11C. The described rotation will cause shaft 11C and the customer reel C to be rotated in the required counter-clockwise direction.

As shown by the dotted outline representations in FIGURE 2, spur gear 48 may be moved to other alternate positions so that the working reel W may be power rotated in the counter-clockwise direction or to a neutral position with the crank arm disposed vertically wherein the drive system will be disconnected and all reels will be able to rotate freely. When this gearing system is in the described neutral position, the rotation of shaft 46 may be used to drive a winch drum 52 through actuation of a clutch drive connector 53. Rotation of the winch drum 52 may be used to facilitate placement and installation of the cable or parallel runs of wires that have been made up and that are disposed as an end product on customer reel C. The desired positioning of crank arm 49 may be regulated by rotating sleeve 54 on crank arm 49 about the shaft 46. As illustrated in FIGURE 8, a shifting handle 56 may be attached to the portion of sleeve 54 that extends out through gear box 27 to facilitate engagement and disengagement of idler gear 48, as desired.

The described winch function of the apparatus is illustrated in FIGURE 8. This figure illustrates the placement of an assembled cable 60 in a conduit run 61. The winch line 62 that has been pulled off the winch drum 52 is connected to a fish wire (not shown) run through the conduit 61, and as the wire is withdrawn by action of the winch, cable 60 will be introduced into the conduit 61 and will be pulled therethrough. Since the idler gear 48 is in the neutral position, reel C will be free to rotate so that the cable 60 will be unreeled as the winch line 62 is pulled in. This particular arrangement, in which apparatus is provided for the fabrication of the multi-strand cable and in which the same drive arrangement provides a winch capability, is of particular benefit for use on job sites where difficult installation problems are often encountered.

As previously set forth, the particular drive arrangement for the inter-working reels can be modified in many respects, and it is presently recognized that refinements of the drive system may in many instances be advisable. An ultimate system would include provision for rotating each of the three reels in forward or reverse directions and at speeds which varied in accordance with the strand displacement requirements. Such a system could make the handling of longer continuous supply strands possible and would avoid possible problems inherent in the rotation of large and heavy reels by tension forces exerted on the strand materials. The incorporation of further mechanisms which would adjust the tension forces in all of the separate strands that are being assembled into a cable is foreseen and would add to the efficiency of the apparatus for some uses.

The inventor presently realizes that many different types of auxiliary apparatus may be usable in connection with the present device. The measuring attachment 13 described may be coupled with an automatic cutoff or parting device which would be actuated when the required length of strand has been removed from the supply. Further, it is recognized that level winding apparatus may be used to maintain the strands and cables in equally disposed positions along the drum surface of the reels.

FIGURES 6 and 7 illustrate the use of a cable binding apparatus which is particularly adapted to wrap and hold the multi strands of a cable in packaged and non-interfering arrangement. This binding device 70, which may be mounted to the frame 12, includes a hollow guide tube 71 through which the strands of a cable 60 are introduced. The tube 71 provides support for a spool 72 of cord 73 or similar binding material placed in open end arrangement on such tube. As the cable 60 passes through the tube 71 a strand of binder cord 73 will be pulled off the spool 72 and will be wrapped in helical pattern about the cable 60. Essentially the arrangement provides a free spool type of removal pattern for the binder cord 73. Use of the device indicates that a tension retaining element is in some instances advisable to control removal of the binder cord 73. Where various types of pressure sensitive tape are substituted for binder cord 73, tension control has been found unnecessary. Whether tapes or cord are used, it has been found that the use of the binder apparatus 70, as shown, has helped to avoid the unwanted intermingling of strands from separate lays of cable.

From the foregoing description and drawings, it should be apparent that the present invention is capable of many and varied modifications and changes. All such modifications and changes as come within the scope of the hereunto appended claims are considered to be a part of this invention. In the foregoing descriptive materials the terms cut and sever have been used to indicate separation of one strand from another as the strands are drawn successively from the supply. Obviously it is not necessary that the strands be fully separated or cut one from the other. The terminal end of one strand and the lead end of the next may be established by doubling the supply material on itself. The doubled end can then be engaged to the next winding reel to continue the cable paralleling functions. This cutting, severing or doubling function is identified in the appended claims by the term "parting" which should be interpreted to include all such alternate functions.

I claim:

1. The method for making up a multi-strand cable from a supply source consisting of a continuous length of single strand material which comprises engaging the lead end of a first strand from said supply source with a first reel and winding same about said first reel until the full length of the first strand has been removed from the supply source, parting said first strand and supply source, engaging the terminal end for said first strand and the lead end of a second strand derived by said parting with a second reel, winding said first and second strands about said second reel as they are removed simultaneously from said first reel and supply source until the full length of said second strand has been removed from the supply source, thereafter parting said second strand and supply source, engaging the terminal end of said second strand and the lead end of a third strand as derived by said second parting and the original lead end of the first strand with the said first reel, and winding said first, second and third strands simultaneously about said first reel as they are removed simultaneously from said second reel and supply source until the full length of said third strand has been removed from the supply source whereby a multi-strand cable is derived.

2. The method for making up a multi-strand cable from a single strand supply of material through use of two winding reels which comprises the winding of an additional strand length of said material on to a first one of the two said winding reels at the same time that previous strand lengths of said material parted from said supply of material are being removed from the second of said two reels for simultaneous placement on the first reel together with the said additional strand length of said material.

3. The method for making up a multi-strand cable from a single strand supply of material through use of two winding reels which comprises the winding of an additional strand length of said material on to a first empty one of the two said winding reels at the same time that previous strand lengths of said material parted from said supply of material are being removed from the second of said two reels for placement on said first reel simultaneously with the said additional strand length of said material.

4. The method for making up a multi-strand cable from a single strand supply of material through use of two winding reels which comprises the winding of an additional strand length of said material on to a first empty one of the two said winding reels at the same time that previous strand lengths of said material parted from said supply of material are being removed from the second of said two reels for placement on said first reel simultaneously with the said additional strand length of material, and separately lacing a binder strip about all strands of said cable before the strands are simultaneously placed on said first reel.

5. The method for making up a multi-strand cable from a single strand supply of material through use of two winding reels which comprises the winding of an additional strand length of said material on to a first empty one of the two said winding reels at the same time that all previously placed strand lengths of said material parted from said supply of material are being removed from the second of said two reels for placement on said first reel simultaneously with the said additional strand length of said material whereby the second reel is emptied, and repeating said operation by alternately utilizing the newly emptied second and first reel until a cable of the desired number of strands has been derived.

6. Apparatus for the fabrication and on-site installation of multi-strand cables from a single strand supply comprising an intermediate working reel, a customer reel for the derived cable, arbors for the support of said reels, support frames adapted to receive and support said arbors, separate drive means interconnected to said reels, a power source, intermediate drive gears connected to said power source, selective drive control means for operation between said intermediate drive gears and a selected one of said separate reel drive means for alternate interconnection therewith to rotate said reels in at least one direction to alternately wind strand materials on one or the other of said reels whereby strands previously withdrawn from said supply and wound on a first one of said reels may be removed therefrom for introduction and winding on to the other of said reels simultaneously with the introduction and winding of a further strand from said supply until the desired multi-strand cable has been derived, and a winch drum connected to said intermediate drive gears for pulling the derived cable from the final reel for placement at on-site installations.

References Cited in the file of this patent

UNITED STATES PATENTS

| | | |
|---|---|---|
| 1,956,730 | Reichelt | May 1, 1934 |
| 2,331,240 | Selvig | Oct. 5, 1943 |
| 2,998,694 | Haugwitz | Sept. 5, 1961 |

FOREIGN PATENTS

| | | |
|---|---|---|
| 847,897 | Great Britain | Sept. 14, 1960 |